United States Patent
Chen et al.

(10) Patent No.: US 9,800,514 B1
(45) Date of Patent: Oct. 24, 2017

(54) PRIORITIZING DATA PACKETS IN A NETWORK

(71) Applicant: Red Hat, Inc., Raleigh, NC (US)

(72) Inventors: Huamin Chen, Westboro, MA (US); Jay Vyas, Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/379,738

(22) Filed: Dec. 15, 2016

(51) Int. Cl.
| | | |
|---|---|---|
| *H04L 12/28* | (2006.01) | |
| *H04L 12/865* | (2013.01) | |
| *H04L 29/06* | (2006.01) | |
| *H04L 12/851* | (2013.01) | |
| *H04J 1/16* | (2006.01) | |

(52) U.S. Cl.
CPC .......... *H04L 47/6275* (2013.01); *H04L 47/24* (2013.01); *H04L 69/22* (2013.01)

(58) Field of Classification Search
USPC ........................................ 370/389, 252, 386
See application file for complete search history.

(56) References Cited

U.S. PATENT DOCUMENTS

| | | |
|---|---|---|
| 6,304,578 B1 | 10/2001 | Fluss |
| 6,412,000 B1 | 6/2002 | Riddle et al. |
| 7,290,134 B2 | 10/2007 | Buer et al. |
| 7,340,535 B1 | 3/2008 | Alam |
| 7,409,450 B2 | 8/2008 | Jorgensen |
| 8,027,255 B2 | 9/2011 | Kahn et al. |
| 8,081,566 B1 * | 12/2011 | Ashwood-Smith ... H04L 47/122 370/230 |
| 8,429,362 B1 | 4/2013 | Natanzon et al. |
| 8,909,767 B2 | 12/2014 | Sunkara et al. |
| 8,972,405 B1 | 3/2015 | Chaulk et al. |
| 9,086,923 B2 | 7/2015 | Parashar et al. |
| 9,158,590 B2 | 10/2015 | Boss et al. |
| 9,274,917 B2 | 3/2016 | Milojicic et al. |
| 2009/0073971 A1 | 3/2009 | Taaghol |
| 2010/0198982 A1 * | 8/2010 | Fernandez ............. G06Q 30/02 709/231 |

(Continued)

FOREIGN PATENT DOCUMENTS

EP    1162798    12/2001

OTHER PUBLICATIONS

Mihailescu, M., et al., "Dynamic Resource Pricing on Federated Clouds," 2010 http://di.acm.org/citation.cfm?id=1845169.

(Continued)

*Primary Examiner* — John Pezzlo
(74) *Attorney, Agent, or Firm* — Kilpatrick Townsend & Stockton LLP

(57) ABSTRACT

Data packets being communicated through a communications network can be prioritized. For example, a processor can receive a data packet via the communications network. The data packet can be formed according to a communications protocol and have a header field with an initial value. The processor can determine an updated value for the header field of the data packet based on the initial value from the header field and a user account associated with the data packet. The processor can update the header field to have the updated value. The processor can then prioritize the data packet with respect to at least one other data packet based on the updated value of the header field.

17 Claims, 4 Drawing Sheets

(56) References Cited

U.S. PATENT DOCUMENTS

2011/0064093 A1\* 3/2011 Mattson ............... H04L 47/10
                                                    370/474
2011/0085551 A1   4/2011 Sridhar et al.
2014/0341015 A1  11/2014 Johansson et al.
2015/0326696 A1  11/2015 Mao
2016/0156567 A1   6/2016 Miyahara et al.

OTHER PUBLICATIONS

Haresh, M.V., et al., "Agent Based Dynamic Resource Allocation on Federated Clouds," Indian Institute of Information Technology Kottayam, Kerala Computer Science and Engineering; National Institute of Technology Calicut Department of Computer Science & Engineering, 2011, https://www.researchgate.net/publication/261453101_Agent_based_dynamic_resource_allocation_on_federated_clouds.

Aazam, M., et al., "Advance Resource Reservation and QoS Based Refunding in Cloud Federation," Computer Engineering Department, Kyung Hee University, Suwon, South Korea; Computer Engineering Department, Kyung Hee University, Suwon, South Korea, Dec. 8-12, 2014, http://ieeexplore.ieee.org/document/7063420/.

\* cited by examiner

PRIORITIZING DATA PACKETS IN A NETWORK

TECHNICAL FIELD

The present disclosure relates generally to flow control of data transmission through a network. More specifically, but not by way of limitation, this disclosure relates to prioritizing data packets in a network.

BACKGROUND

A data packet can include information to be communicated through a network, such as a local area network (LAN) or a wide area network (WAN). The data packet can be formed according to a communications protocol, such as the Internet Protocol (IP). The data packet can include a header having one or more header fields that convey additional information about the data packet. For example, the data packet can include a header field that has an IP address of the computing device that sent the data packet. The data packet can include another header field that has another IP address of another computing device intended to receive the data packet.

Computing devices can transmit data packets through a network to communicate with one another. Typically, the network-hardware components (e.g., routers, hubs, switches, etc.) that form the physical infrastructure behind the network route the data packets to their destinations on a "first come, first serve" basis. That is, the network-hardware components analyze and forward the data packets in the order in which the data packets were received.

DETAILED DESCRIPTION

Figure 1:
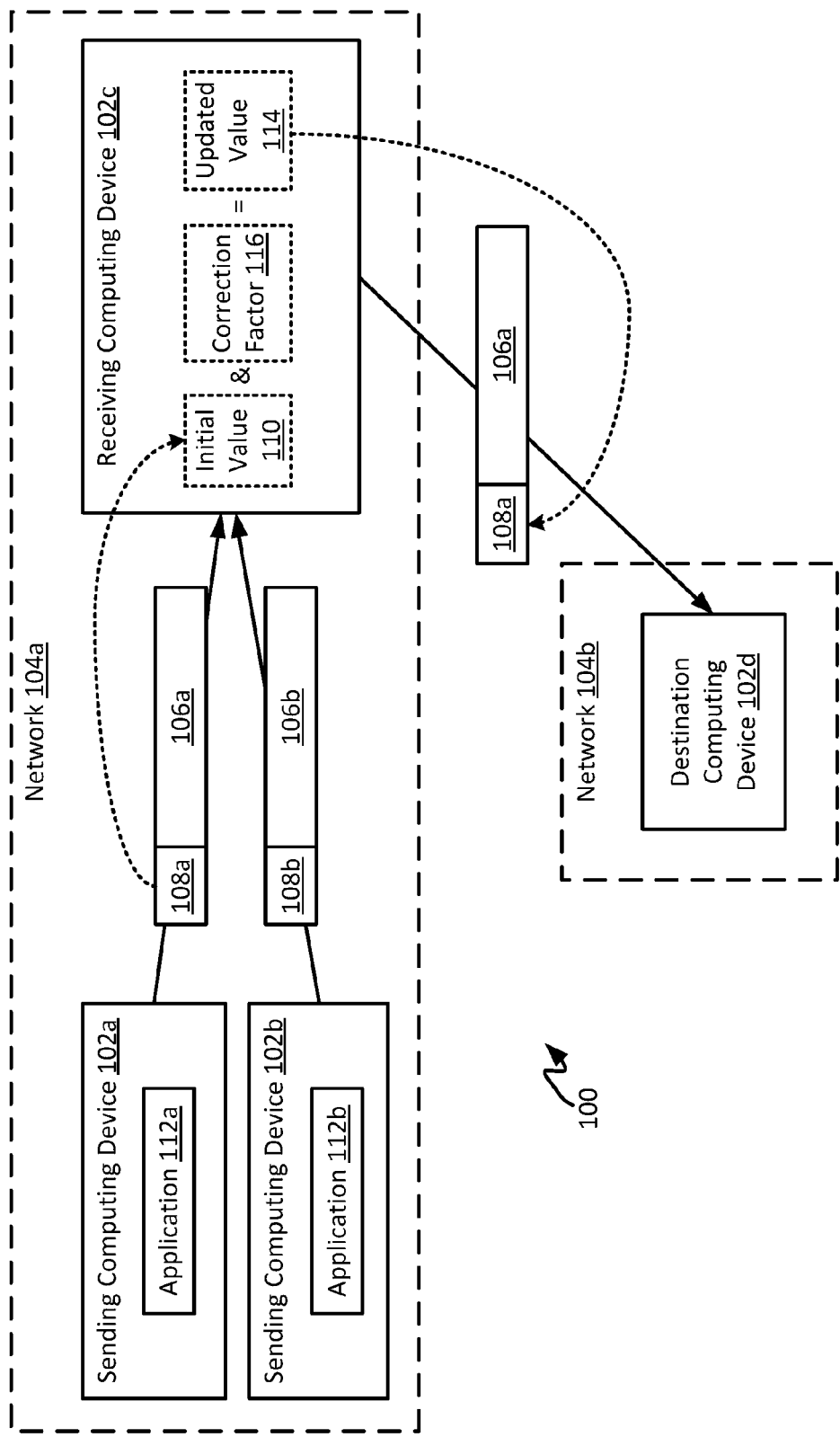
FIG. 1 is a block diagram of an example of a system for prioritizing data packets in a network according to some aspects.

There can be disadvantages to routing data packets through a network on a "first come, first serve" basis. For example, higher priority data packets (e.g., data packets associated with higher priority applications, users, or tasks) may experience the same level of network latency as lower priority data packets. This may be unsuitable for certain applications, users, or tasks.

Some examples of the present disclosure overcome one or more of the abovementioned issues by prioritizing data packets being communicated through a network. This may enable higher-priority data packets to experience less network latency than lower-priority data packets.

As a particular example, a user can perform tasks in a cloud-computing environment. As the user performs tasks, the cloud-computing environment can automatically back-up the user's data for redundancy (e.g., so that a back-up copy is available if the user's data is accidentally deleted or corrupted at a primary location). The cloud-computing environment may immediately back-up the user's data as soon as the cloud-computing environment determines that a change has been made to the user's data. This type of immediate back-up can be referred to as synchronous replication. Alternatively, the cloud-computing environment may back-up the user's data at regular intervals, such as once per minute, or in response to a triggering event, such as receiving user input. This type of postponed back-up can be referred to as asynchronous replication. Either way, the cloud-computing environment can back-up the user's data by transmitting data packets that include copies of the user's data, which can be referred to as back-up data packets, through a network. For example, the cloud-computing environment can transmit the back-up data packets through the network to a computing device operable to store the back-up data in memory, such as on a hard disk.

The cloud-computing environment may form the back-up data packets differently based on whether the cloud-computing environment is operating in a synchronous-replication mode or an asynchronous-replication mode. For example, because the back-up data packets are immediately transmitted in the synchronous-replication mode, it is more likely that the user's data will be replicated within an acceptable time period. So, if the cloud-computing environment is operating in the synchronous-replication mode, the cloud-computing environment can insert a default value (e.g., 122) into a particular header field (e.g., a type-of-service header field) of the back-up data packets. This may cause the back-up data packets to propagate through the network with a medium level of priority. Conversely, there may be a higher likelihood of the user's data not being replicated within the acceptable time period in the asynchronous-replication mode, because the back-up data packets are not immediately transmitted. So, if the cloud-computing environment is operating in the asynchronous-replication mode, the cloud-computing environment can insert a higher value (e.g., 190) into the particular header field of the back-up data packets. This may cause the back-up data packets to propagate through the network with a higher level of priority.

In some examples, the cloud-computing environment can insert a value into the particular header field that is additionally or alternatively determined based on the amount of data to be replicated. For example, a large amount of (e.g., 10 gigabytes) may take a long time to replicate, increasing the likelihood that the user's data will not be replicated within the acceptable time period. To overcome this issue, the cloud-computing environment can insert a higher value into the particular header field of the back-up data packets if the amount of data to replicate is higher, and a lower value into the particular header field of the back-up data packets if the amount of data to replicate is lower (e.g., 1 gigabyte). This may enable the user's data to be replicated within the acceptable time period, regardless of the amount of data to be replicated.

In some examples, as data packets (including back-up data packets) propagate through the network, a network-hardware component of the cloud-computing environment can receive the data packets and adjust the value of the particular header field to further adjust the priority of the data packets. For example, the network-hardware component can determine an initial value in the particular header field of a data packet, increase the initial value by adding a correction factor to the initial value, and insert the new value back into the particular header field. The correction factor may be determined based on the priority of a user account associated with the data packet, with higher-priority user accounts having a higher-value correction factor and lower-priority user accounts having a lower-value correction factor. The network-hardware component can then sort the data packets into different queues based on the respective values in the particular header field of the data packets. For example, the network-hardware component can sort the data packets into a low-priority data-transmission queue, a medium-priority data-transmission queue, and a high-priority data-transmission queue based on the respective values in the header fields of the data packets. The network-hardware component can then transmit data packets from each of the queues, giving preference to the data packets in the high-priority queue. This may enable the data packets associated with higher-priority user accounts to be communicated through the network with reduced latency, thereby minimizing data loss and ensuring that the user's data is backed-up in a timely manner.

Some examples can implement some or all of the above-mentioned features to ensure that higher-priority data packets are timely communicated through the network.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for prioritizing data packets 106a-b in a network 104a according to some aspects. The network 104a includes a sending computing device 102a transmitting a data packet 106a. The network 104a also includes another sending computing device 102b transmitting another data packet 106b. The network 104a includes a receiving computing device 102c that can receive the data packets 106a-b, determine a priority among the data packets 106a-b, and transmit the data packets to a destination in an order according to the priorities of the received data packets 106a-b. One example of the destination can be network 104b and/or destination computing device 102d.

In some examples, the receiving computing device 102c prioritizes the data packets 106a-b based on values in one or more header fields of the headers 108a-b of the data packets 106a-b. Data packets 106a-b can be formed according to a communications protocol, such as the internet protocol (IP), the transmission control protocol (TCP), the user datagram protocol (UDP), etc., and may include header fields according to such protocols. One or more of the header fields, such as a priority field, can be dedicated to priority information, or priority may be inferred from other header fields, such as a header field indicating a sender of the data packet 106a-b, a destination for the data packet 106a-b, an application associated with the data packet 106a-b, etc.

For example, the headers 108a-b of the data packets 106a-b can include type-of-service header fields having respective type-of-service values. In this example, a type-of-service value can range from zero (lowest priority) to 244 (highest priority), though in other examples, other ranges may be employed. After receiving the data packets 106a-b, the receiving computing device 102c can determine a first type-of-service value, such as 210, included within the header 108a of data packet 106a, and a second type-of-service value, such as 55, included within the header 108b of data packet 106b. The receiving computing device 102c can then determine that the first type-of-service value is higher than the second type-of-service value and, based on that determination, assign the data packet 106a a higher priority than data packet 106b. For example, the receiving computing device 102c can include the data packet 106a in a high-priority data-transmission queue, so that data packet 106a is transmitted to its destination before data packet 106b.

As another example, the receiving computing device 102c can determine an initial value 110 for a header field a data packet 106a. The receiving computing device 102c applies a correction factor 116 to the initial value 110 to determine an updated value 114 for the header field of the data packet 106a. The receiving computing device 102c then inserts the updated value 114 into the header field, or overwrites the header field with the updated value 114. The receiving computing device 102c can repeat this process to determine another new value for a header field of another data packet 106b. The receiving computing device 102c can prioritize the data packets 106a-b based on the new values of the header fields. The receiving computing device 102c can then transmit the data packets 106a-b according to the priority.

For example, the receiving computing device 102c can determine a type-of-service value from a type-of-service header field of the data packet 106a. The type-of-service value can be the initial value 110. The type-of-service value (initial value 110) can be set by the application 112a or the sending computing device 102a. The receiving computing device 102c can also determine a quality-of-service group number associated with the data packet 106a. The quality-of-service group number can be the correction factor 116. The receiving computing device 102c can apply (e.g., add, subtract, multiple, divide, or apply another mathematical operation using) the quality-of-service group number to the type-of-service value to determine the updated value 114 for the header field. The receiving computing device 102c can also perform the abovementioned steps to determine another new value associated with data packet 106b. The receiving computing device 102c can then prioritize the data packets 106a-b based on their respective new values. For example, the receiving computing device 102c can insert the respective new values into the respective headers 108a-b of the data packets 106a-b, and then put the data packets 106a-b in different data-transmission queues based on the new values in the headers 108a-b of the data packets 106a-b. This may cause the updated version of the data packet 106a to be transmitted to its destination before the updated version of the data packet 106b. In some examples, by prioritizing the data packets 106a-b based on both (i) information set by the applications 112a-b (or sending computing devices 102a-b), and (ii) the quality-of-service group number, the importance of the data packets 106a-b may be more accurately determined.

In some examples, the receiving computing device 102c prioritizes the data packets 106a-b using any number and combination of additional or alternative methods. For example, the receiving computing device 102c can prioritize the data packets 106a-b based on the communications protocol used to form the data packets 106a-b. For example, the data packet 106a may have been formed according to a UDP protocol, and the data packet 106b may have been formed according to the ICMP protocol. In some examples, the receiving computing device 102c determines the communications protocols used to form the data packets 106a-b by analyzing the headers 108a-b of the data packets 106a-b, such as a header field indicative of the protocol-type used to form the data packets 106a-b. The receiving computing device 102c can then determine that the protocol-type associated with data packet 106a has a higher priority than the protocol-type associated with data packet 106b. For example, the receiving computing device 102c can use a database (e.g., a lookup table) that correlates protocol-types to priority levels to determine that a UDP data packet has a higher priority-level than an ICMP data packet. Based on this determination, the receiving computing device 102c can assign the data packet 106a a higher priority than data packet 106b. For example, the receiving computing device 102c can include the data packet 106a in a high-priority data-transmission queue, so that data packet 106a is transmitted to its destination before data packet 106b.

In some examples, the receiving computing device 102c prioritizes the data packets 106a-b based on the sending computing device 102a-b associated with the data packets 106a-b. For example, the receiving computing device 102c can analyze the header 108a of data packet 106a to determine a source IP address associated with the data packet 106a. The source IP address can belong to sending computing device 102a. The receiving computing device 102c can also analyze the header 108b of data packet 106b to determine another source IP address associated with the data packet 106b. The source IP address can belong to sending computing device 102b. The receiving computing device 102c can then determine priorities among the sending computing devices 102a-b. For example, the receiving computing device 102c can access a database that includes sending computing devices 102a-b correlated to priority levels. The receiving computing device 102c can use the database to determine a priority level for each sending computing device 102a-b. The receiving computing device 102c can then prioritize the data packets 106a-b based on the priority levels of the corresponding sending computing devices 102a-b. For example, data packet 106a, which is associated with a higher-priority sending computing device 102a, can be assigned a higher priority than a data packet 106b, which is associated with a lower-priority sending computing device 102b. This may enable a sending computing device 102a that is executing a more critical application or task, or is owned or operated by a more important user, to experience reduced latency.

In some examples, the receiving computing device 102c prioritizes the data packets 106a-b based on software associated with the data packets 106a-b. For example, sending computing device 102a may execute application 112a, which can include a game, a utility application, a back-up application for backing up user data, an operating system (e.g., Windows™, Linux, or OS X), or any combination of these. The application 112a may have a higher priority than another application, such as application 112b, which may executing on the same computing device or another computing device, such as sending computing device 102b. In some examples, the application 112a can include an identifier in the data packet 106a that indicates that the data packet 106a is associated with the application 112a. For example, the application 112a can include, in the header 108a of the data packet 106a or in the payload of the data packet 106a, a unique number or string that is indicative of the application 112a. The receiving computing device 102c can receive the data packet 106a and determine, based on the identifier, that the data packet 106a is associated with application 112a. For example, the receiving computing device 102c can use a database to correlate the identifier to the application 112a. The receiving computing device 102c may also determine that another data packet 106b is associated with another application 112b. The receiving computing device 102c can determine a priority among the applications 112a-b. For example, the receiving computing device 102c can use a database to correlate each application 112a-b to a respective indicator of priority (e.g., priority level, quality-of-service group number, etc.). The receiving computing device 102c can then prioritize the data packets 106a-b based on the priorities associated with the corresponding applications 112a-b. For example, data packet 106a, which is associated with application 112a, can be assigned a higher priority than a data packet 106b, which is associated with application 112b.

The system 100 can include any number and combination of networks 104a-b. The networks 104a-b can be wired, wireless networks, or any combination of these. Examples of the networks 104a-b can include a local area network (LAN), a wide area network (WAN), the Internet, a cloud-computing environment, a cloud federation, a telecommunication network, a cellular network, or any combination of these. Also, the system 100 can include any number and combination of computing devices 102a-d distributed among the networks 104a-b. For example, although destination computing device 102d is shown in FIG. 1 as being part of a separate network 104b, in other examples, the destination computing device 102d can be included in the network 104a. And the computing devices 102a-d can be physically positioned or arranged in any configuration within the physical infrastructure forming the networks 104a-b. For example, receiving computing device 102c can be positioned at the physical edge of the network 104a.

In some examples, the computing devices 102a-d can be desktop computers, laptop computers, servers, network-hardware components, mobile phones, or any combination of these. For example, the sending computing devices 102a-b can both be servers. The receiving computing device 102c can be a router for receiving the data packets 106a-b from the servers, prioritizing the data packets 106a-b according to any number and combination of the abovementioned methods, and transmitting the data packets 106a-b to destination computing device 102d, which can also be a server.

Figure 2:
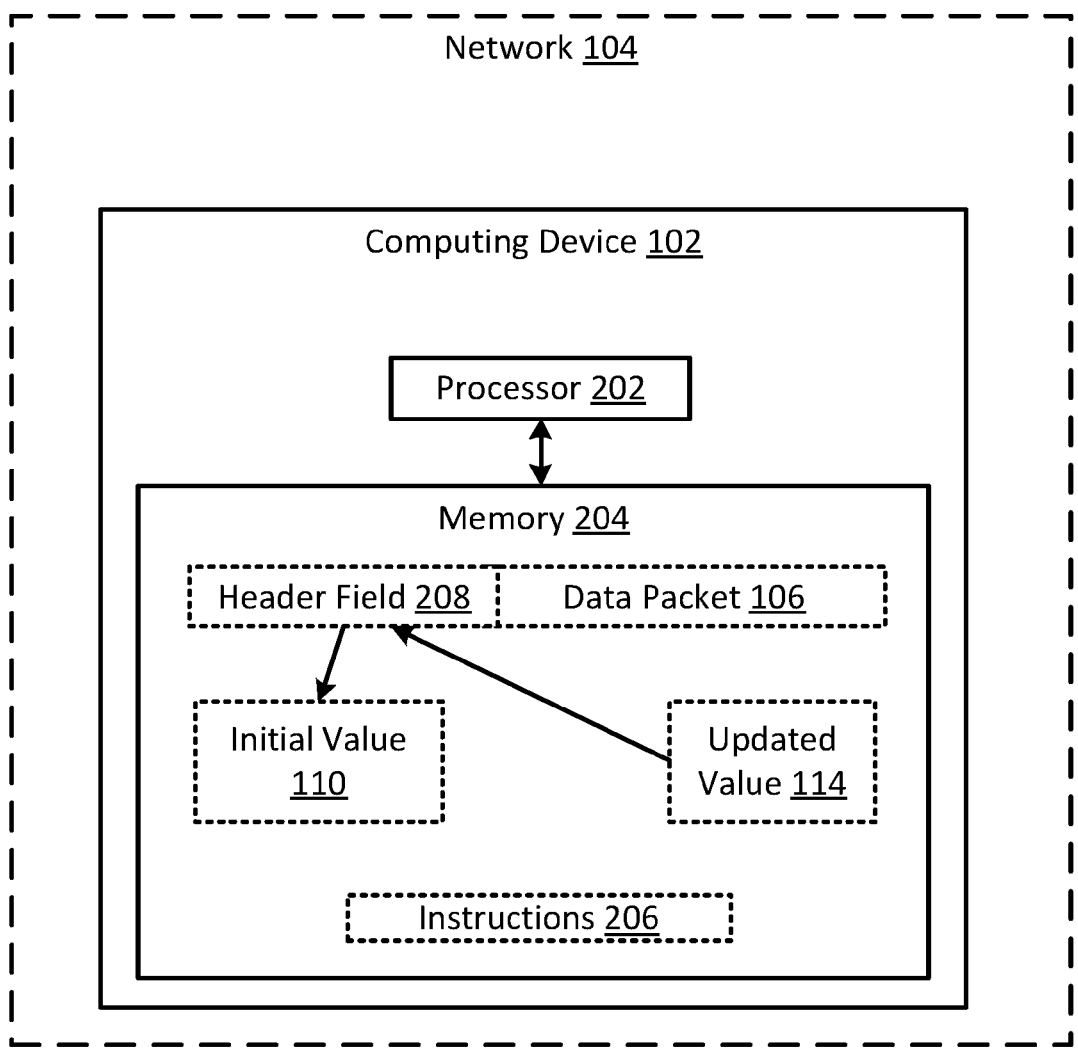
FIG. 2 is a block diagram of an example of a computing device for prioritizing data packets in a network according to some aspects.

One example of a block diagram of a computing device 102 is shown in FIG. 2. The computing device 102 includes a processor 202 and a memory 204. In some examples, the processor 202 and memory 204 can be integrated into a single computing device. In other examples, the processor 202 and memory 204 can be distributed among two or more computing devices.

The processor 202 can execute one or more operations for prioritizing data packets in a network 104. The processor 202 can execute instructions 206 stored in the memory 204 to perform the operations. The processor 202 can include one processor or multiple processors. Non-limiting examples of the processor 202 include a Field-Programmable Gate Array (FPGA), an application-specific integrated circuit (ASIC), a microprocessor, etc.

The processor 202 can be communicatively coupled to the memory 204 via a bus. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. In some examples, at least some of the memory 204 can include a medium from which the processor 202 can read the instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions. The instructions 206 can include processor-specific instructions generated by a compiler or an interpreter from code written in any suitable computer-programming language, such as C, C++, C#, etc. In some examples, the memory can include a data packet 106 having a header field 208.

Figure 3:
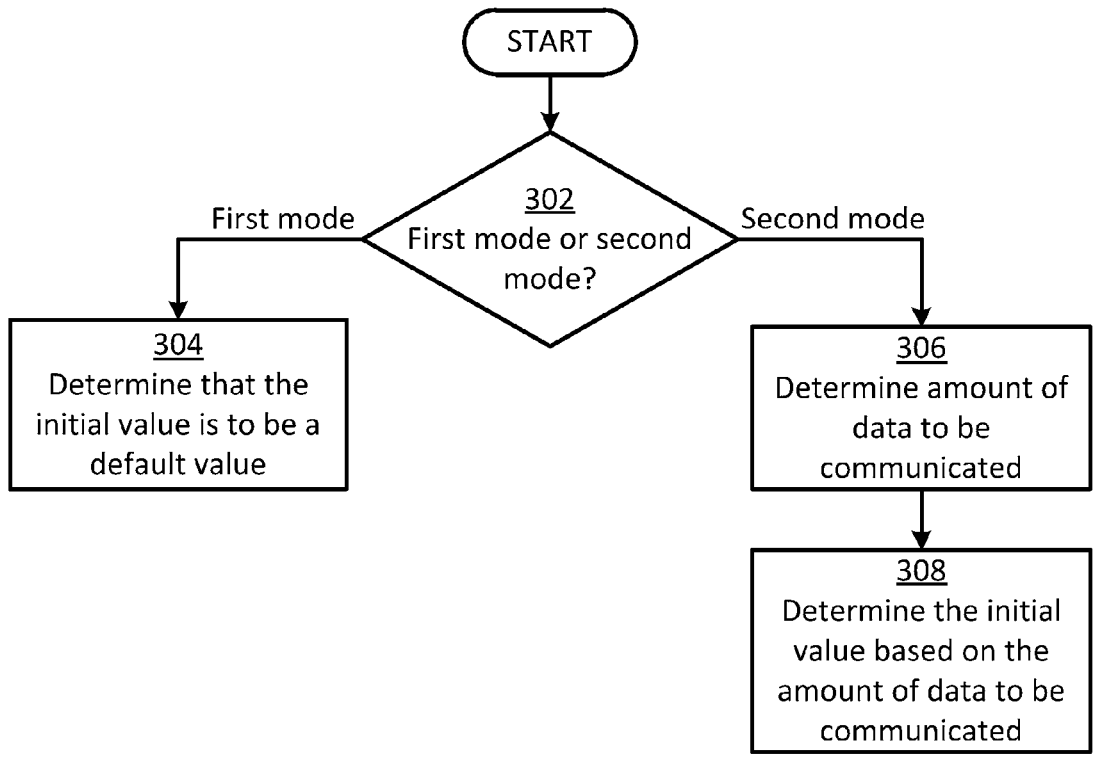
FIG. 3 is a flow chart showing an example of a process for determining an initial value for a header field of a data packet according to some aspects.

FIG. 3 is a flow chart showing an example of a process for determining an initial value 110 for a header field 208 of data packet 106 according to some aspects. Some examples can include more, fewer, or different steps than the steps depicted in FIG. 3. The steps of FIG. 3 are described with reference to components described above with regard to FIGS. 1-2.

In block 302, the sending computing device 102a determines if the system 100 is operating in a first mode or a second mode. In some examples, the first mode can be a synchronous-replication mode and the second mode can be an asynchronous-replication mode. For example, the sending computing device 102a can determine that a mode setting or parameter stored in memory 204 indicates that the sending computing device 102a is operating in a synchronous-replication mode.

If the sending computing device 102a determines that the system 100 is operating in the first mode, the process can proceed to block 304. Otherwise, the process can proceed to block 306.

In block 304, the sending computing device 102a determines that the initial value 110 for the header field 208 is to be a default value. The default value can be preset by a system administrator or other user. The default value can be a value that causes the data packet 106a to be communicated through the network 104a with a medium level of priority. For example, if the header field 208 is a type-of-service header field, the sending computing device 102a can determine that the initial value 110 is to be a default value of 122 (e.g., a median value between zero and 244).

In block 306, the sending computing device 102a determines an amount of data to be communicated through the network 104a. For example, the sending computing device 102a can be executing a data-replication application for replicating, mirroring, or otherwise backing-up data across multiple networks 104a-b, computing devices 102a-d, or both. The sending computing device 102a can determine an amount of data that has already been replicated, an amount of data for which there are changes that need to be replicated, and/or otherwise determine an amount of data that needs to be replicated. The sending computing device 102a can use this amount of data as the amount of data to be communicated through the network 104a (or to otherwise determined the amount of data to be communicated through the network 104a).

In block 308, the sending computing device 102a determines the initial value 110 for the header field 208 based on the amount of data to be communicated through the network 104a. For example, the sending computing device 102a can use a database to correlate the amount of data to an initial value 110. For example, the amount of data may be 4 gigabytes. The sending computing device 102a can use the database to correlate this amount of data to a particular initial value, such as 195.

As another example, the sending computing device 102a can use an algorithm to determine the initial value 110 for the header field 208 based on the amount of data to be communicated through the network 104a. For example, the sending computing device 102a may apply a linear algorithm that increases the initial value 110 for the header field 208 as the amount of data to be communicated through the network 104a increases. The sending computing device 102a can apply any number and combination of mathematical operations to the amount of data to be communicated through the network 104a to determine the initial value 110.

Figure 4:
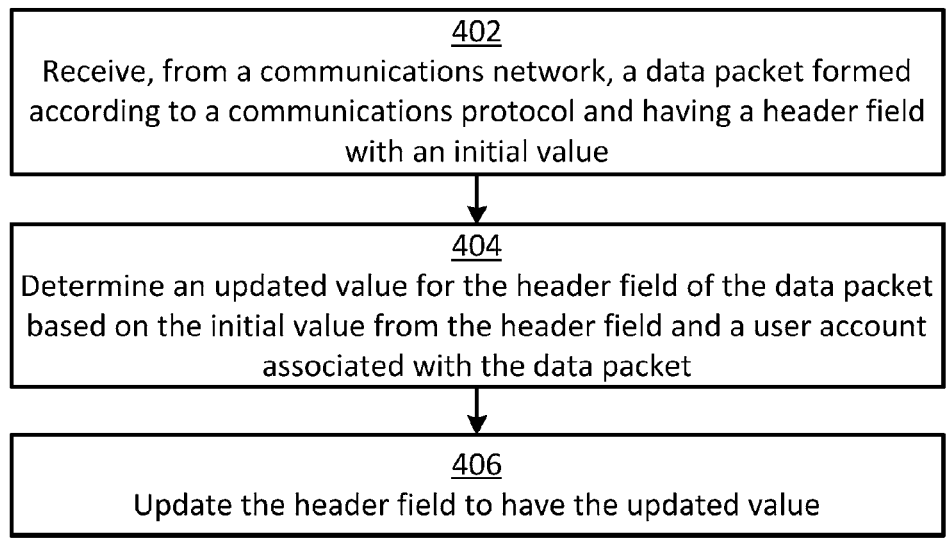
FIG. 4 is a flow chart showing an example of a process for prioritizing data packets in a network according to some aspects.

Turning now to FIG. 4, FIG. 4 is a flow chart showing an example of a process for prioritizing data packets 106a-b in a network according to some aspects. Some examples can include more, fewer, or different steps than the steps depicted in FIG. 4. The steps of FIG. 4 are described with reference to components described above with regard to FIGS. 1-2.

In block 402, the receiving computing device 102c receives, from a communications network, a data packet 106a formed according to a communications protocol and having a header field 208 with an initial value 110. Examples of the communications protocol can include TCP, the IP, the Bluetooth protocol, the file transfer protocol, the post office protocol, the hypertext transfer protocol (HTTP), the secure socket layer (SSL) protocol, the point to point protocol (PPP), the telnet protocol, the secure shell (SSH) protocol, the Internet Message Access Protocol (IMAP), the Bitcoin protocol, the Internetwork Packet Exchange/Sequenced Packet Exchange (IPX/SPX) protocol, the X.25 protocol, the AppleTalk protocol, or any combination of these.

As a particular example, the receiving computing device 102c can receive over a wireless LAN a data packet 106a formed according to the IP communications protocol that carries a TCP packet. The data packet 106a can have a header 108a with a type-of-service header field. The type-of-service header field can have an initial type-of-service value.

In block 404, the receiving computing device 102c determines an updated value 114 for the header field 208 of the data packet 106a based on the initial value 110 from the header field 208 and a user account associated with the data packet 106a. For example, the receiving computing device 102c can extract the initial value 110 from the header field 208 of the data packet 106. The receiving computing device 102c can also determine a user account associated with the data packet 106. For example, the receiving computing device 102c can analyze the header 108a of data packet 106a to determine a source IP address, destination IP address, or both associated with the data packet 106a. The source IP address, destination IP address, or both can be associated with a particular user account. The receiving computing device 102c can use a database that correlates IP addresses to user accounts to determine the user account(s) associated with the data packet 106a. The receiving computing device 102c can then determine the updated value 114 based on the initial value 110 and the user account.

As a particular example, some user accounts may be associated with a premium membership (or another higher-priority membership) that affords the user account higher priority use of network resources, while other user accounts may be associated with a base-level membership (or another lower-priority membership). Additionally or alternatively, some users may simply be designated as higher priority users than other users. For example, user accounts associated with system administrators may be assigned a higher priority than user accounts associated with customers. The receiving computing device 102c can determine a membership status, priority, quality-of-service group, or other indicator of priority associated with the user account(s). The receiving computing device 102c can then determine the updated value 114 based on the initial value 110 and the indicator of priority. For example, the receiving computing device 102c can use a database that correlates user accounts with respective quality-of-service group numbers to determine a quality-of-service group number associated with each user account. The receiving computing device 102c can then determine the updated value 114 by adding the quality-of-service group number to the initial value 110 or, as another example, by adding a square root of the quality-of-service group number to the initial value 110.

Figure 5:
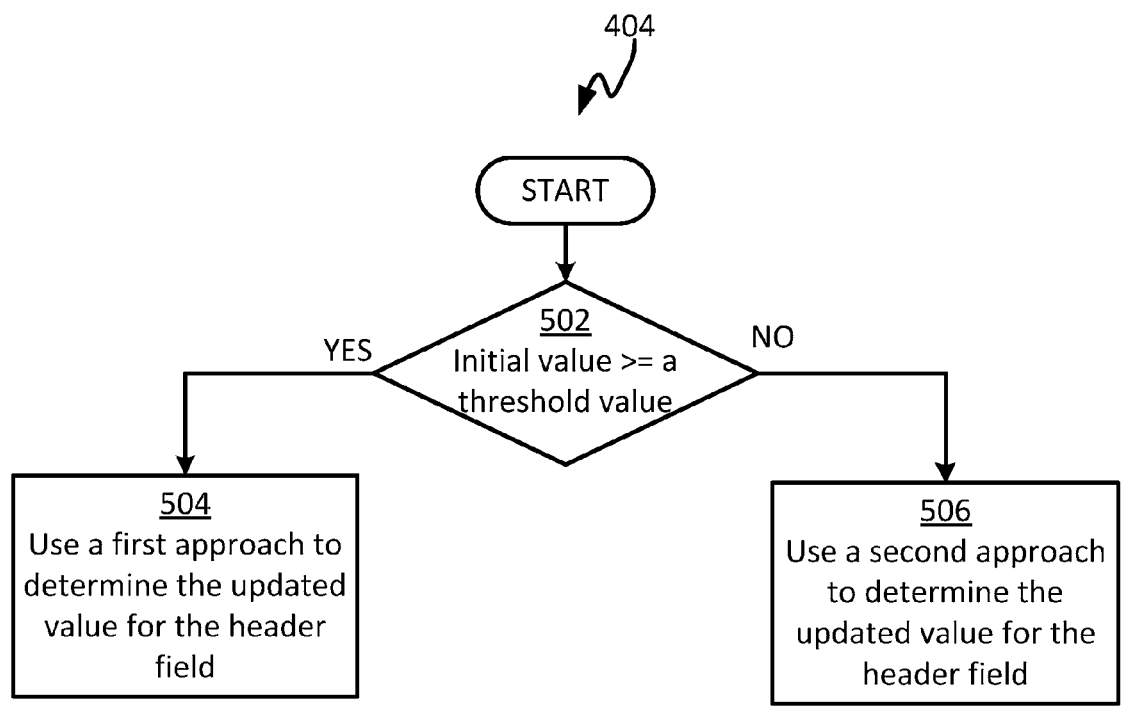
FIG. 5 is a flow chart showing an example of a process for determining an updated value for a header field of a data packet according to some aspects.

In some examples, the receiving computing device 102c can determine the updated value 114 by performing one or more of the steps shown in FIG. 5. Turning now to FIG. 5, in some examples, the receiving computing device 102c determines if the initial value 110 exceeds a threshold value. The threshold value can be preset or otherwise predetermined. For example, the receiving computing device 102c can determine if an initial type-of-service value exceeds a preset threshold-value of 200. If the receiving computing device 102c determines that the initial value 110 exceeds the threshold value, the process can continue to block 504. Otherwise, the process can continue to block 506.

In block 504, the receiving computing device 102c uses a first approach to determine the updated value 114 for the header field 208. For example, the receiving computing device 102c can apply a non-linear function (or alternatively a linear function) to the initial value 110 to determine the updated value 114. As a specific example, if the initial type-of-service value is 203 and the quality-of-service group number is 16, the receiving computing device 102c can add 203 to the square root of 16 to obtain an updated value 114 of 207.

In block 506, the receiving computing device 102c uses a second approach to determine the updated value 114 for the header field 208. The second approach can be different from the first approach. For example, the receiving computing device 102c can apply a linear function (or alternatively a non-linear function) to the initial value 110 to determine the updated value 114. As a specific example, if the initial type-of-service value is 197 and the quality-of-service group number is 16, the receiving computing device 102c can add 197 to 16 to obtain an updated value 114 of 213.

Although the example above has, for simplicity, a single threshold and two alternative approaches, other examples can include any number and combination of thresholds and alternative approaches for determining the updated value 114 for the header field 208. For instance, in another example there can be three thresholds that result in four alternative approaches for determining the updated value 114 for the header field 208.

Returning to FIG. 4, in block 406, the receiving computing device 102c updates the header field 208 to have the updated value 114. For example, the receiving computing device 102c can overwrite or update the existing value in the header field 208 with the updated value 114. Alternatively, the receiving computing device 102c can insert or include the updated value 114 into the header field 208.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A method comprising:
receiving, by a processor and from a communications network, a data packet formed according to a communications protocol and having a header field with an initial value;
determining, by the processor, an updated value for the header field of the data packet based on the initial value from the header field and a user account associated with the data packet;
updating, by the processor, the header field to have the updated value;
including the data packet in a group of data packets;
determining an order in which to transmit data packets in the group of data packets based on a respective value for the header field in each of the data packets; and
transmitting the data packets according to the order.

2. The method of claim 1, wherein the communications protocol is the internet protocol ("IP"), the header field is the IP "type of service" field, and determining the updated value for the header field based on the initial value from the header field and the user account comprises determining the updated value for the header field using the initial value from the header field and a quality-of-service group number associated with the user account.

3. The method of claim 2, wherein determining the quality-of-service group number associated with the data packet comprises:
determining an IP address associated with the data packet by retrieving the IP address from a header of the data packet;
identifying the user account associated with the IP address by correlating the IP address to the user account using a first database; and
determining that the user account is associated with the quality-of-service group number by correlating the user account to the quality-of-service group number using a second database.

4. The method of claim 2, wherein determining the quality-of-service group number associated with the data packet comprises:
determining an application associated with the data packet based on at least one of (i) a header of the data packet or (ii) a payload of the data packet; and
determining the quality-of-service group number based on the application associated with the data packet.

5. The method of claim 2, wherein determining the updated value for the header field comprises:
determining whether the initial value for the header field meets or exceeds a predetermined threshold;
in response to determining that the initial value for the header field meets or exceeds the predetermined threshold, determining that the updated value for the header field is a sum of the initial value and the quality-of-service group number; or
in response to determining that the initial value for the header field is below the predetermined threshold, determining that the updated value for the header field is a square root of the sum of the initial value and the quality-of-service group number.

6. The method of claim 1, wherein the initial value for the header field of the data packet is determined by a remote computing device based on an amount of data to be communicated through the communications network.

7. A non-transitory computer readable medium comprising program code that is executable by a processor to cause the processor to:
  receive, from a communications network, a data packet formed according to an internet protocol ("IP") and having a header field with an initial value, the header field being the IP "type of service" field;
  determine an updated value for the header field of the data packet using the initial value from the header field and a quality-of-service group number that is associated with a user account associated with the data packet; and
  update the header field to have the updated value.

8. The non-transitory computer readable medium of claim 7, further comprising program code that is executable by the processor to cause the processor to determine the quality-of-service group number by:
  determining an IP address associated with the data packet by retrieving the IP address from a header of the data packet;
  identifying the user account associated with the IP address by correlating the IP address to the user account using a first database; and
  determining that the user account is associated with the quality-of-service group number by correlating the user account to the quality-of-service group number using a second database.

9. The non-transitory computer readable medium of claim 7, further comprising program code that is executable by the processor to cause the processor to determine the quality-of-service group number by:
  determining an application associated with the data packet based on at least one of (i) a header of the data packet or (ii) a payload of the data packet; and
  determining the quality-of-service group number based on the application associated with the data packet.

10. The non-transitory computer readable medium of claim 7, further comprising program code that is executable by the processor to cause the processor to determine the updated value for the header field by:
  determining whether the initial value for the header field meets or exceeds a predetermined threshold;
  in response to determining that the initial value for the header field meets or exceeds the predetermined threshold, determining that the updated value for the header field is a sum of the initial value and the quality-of-service group number; or
  in response to determining that the initial value for the header field is below the predetermined threshold, determining that the updated value for the header field is a square root of the sum of the initial value and the quality-of-service group number.

11. The non-transitory computer readable medium of claim 7, further comprising program code that is executable by the processor to cause the processor to:
  include the data packet in a group of data packets;
  determine an order in which to transmit data packets in the group of data packets based on a respective value for the header field in each of the data packets; and
  transmit the data packets according to the order.

12. The non-transitory computer readable medium of claim 7, wherein the initial value for the header field of the data packet is determined by a remote computing device based on an amount of data to be communicated through a network.

13. A system comprising:
a processor; and
a memory on which instructions executable by the processor are stored to cause the processor to:
  receive, from a communications network, a data packet formed according to a communications protocol and having a header field with an initial value;
  determine an updated value for the header field of the data packet based on the initial value from the header field and a user account associated with the data packet;
  update the header field to have the updated value;
  include the data packet in a group of data packets;
  determine an order in which to transmit data packets in the group of data packets based on a respective value for the header field in each of the data packets; and
  transmit the data packets according to the order.

14. The system of claim 13, wherein the communications protocol is the internet protocol ("IP"), the header field is the IP "type of service" field, and the memory further comprises instructions that are executable by the processor to cause the processor to determine the updated value for the header field based on the initial value from the header field and the user account by determining the updated value for the header field using the initial value from the header field and a quality-of-service group number associated with the user account.

15. The system of claim 14, wherein the memory further comprises instructions that are executable by the processor to cause the processor to determine the quality-of-service group number by:
  determining an IP address associated with the data packet by retrieving the IP address from a header of the data packet;
  identifying the user account associated with the IP address by correlating the IP address to the user account using a first database; and
  determining that the user account is associated with the quality-of-service group number by correlating the user account to the quality-of-service group number using a second database.

16. The system of claim 14, wherein the memory further comprises instructions that are executable by the processor to determine the quality-of-service group number by:
  determining an application associated with the data packet based on at least one of (i) a header of the data packet or (ii) a payload of the data packet; and
  determining the quality-of-service group number based on the application associated with the data packet.

17. The system of claim 14, wherein the memory further comprises instructions that are executable by the processor to determine the updated value for the header field by:
  determining whether the initial value for the header field meets or exceeds a predetermined threshold;
  in response to determining that the initial value for the header field meets or exceeds the predetermined threshold, determining that the updated value for the header field is a sum of the initial value and the quality-of-service group number; and
  in response to determining that the initial value for the header field is below the predetermined threshold, determining that the updated value for the header field is a square root of the sum of the initial value and the quality-of-service group number.

* * * * *